(12) United States Patent
Longsworth

(10) Patent No.: US 9,174,144 B2
(45) Date of Patent: Nov. 3, 2015

(54) LOW PROFILE CRYOPUMP

(75) Inventor: Ralph Longsworth, Allentown, PA (US)

(73) Assignee: SUMITOMO (SHI) CRYOGENICS OF AMERICA INC, Allentown, PA (US)

( * ) Notice: Subject to any disclaimer, the term of this patent is extended or adjusted under 35 U.S.C. 154(b) by 561 days.

(21) Appl. No.: 13/451,711

(22) Filed: Apr. 20, 2012

(65) Prior Publication Data

US 2013/0276466 A1  Oct. 24, 2013

(51) Int. Cl.
*B01D 8/00* (2006.01)

(52) U.S. Cl.
CPC ........................... *B01D 8/00* (2013.01)

(58) Field of Classification Search
CPC ........................................................ B01D 8/00
USPC .................................. 62/55.5, 268
See application file for complete search history.

(56) References Cited

U.S. PATENT DOCUMENTS

| | | |
|---|---|---|
| 4,150,549 A | 4/1979 | Longsworth |
| 4,356,701 A | 11/1982 | Bartlett et al. |
| 4,530,213 A | 7/1985 | Kadi |
| 4,691,534 A | 9/1987 | Lombardini et al. |
| 4,958,499 A * | 9/1990 | Haefner et al. ............... 62/55.5 |
| 5,056,319 A | 10/1991 | Strasser |
| 5,156,007 A | 10/1992 | Bartlett et al. |
| 5,542,257 A | 8/1996 | Mattern-Klosson et al. |
| 5,974,809 A | 11/1999 | Wooster et al. |
| 6,155,059 A | 12/2000 | Matte et al. |
| 6,256,997 B1 | 7/2001 | Longsworth |
| 2008/0184712 A1* | 8/2008 | Longsworth ............... 62/55.5 |
| 2010/0011784 A1* | 1/2010 | Longsworth ............... 62/55.5 |

FOREIGN PATENT DOCUMENTS

JP  2008223538 A * 9/2008 ............. F04B 37/08

* cited by examiner

*Primary Examiner* — Emmanuel Duke
(74) *Attorney, Agent, or Firm* — Katten Muchin Rosenman LLP

(57) ABSTRACT

Faster cool down time is achieved in a low profile cryopump by having heat transferred directly from the inlet louver to the first stage heat station through one or more tapered thermal busses, and by obviating the need of a thermal shield over the second stage cylinder of the expander by having second stage cryopanels that form a nested tent like structure, at least one of which, extends over the cylinder.

8 Claims, 3 Drawing Sheets

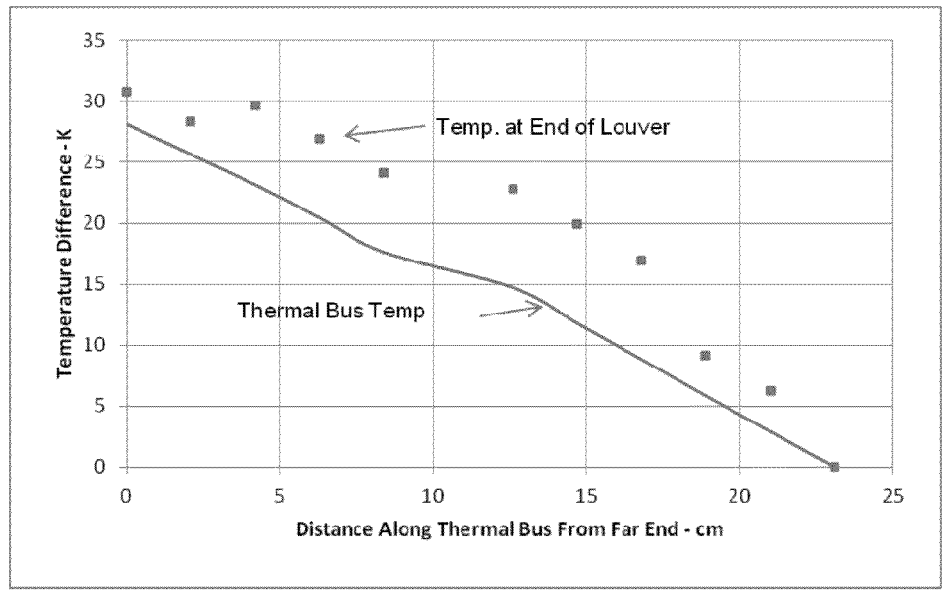
FIG 5a     Tapered Thermal Bus
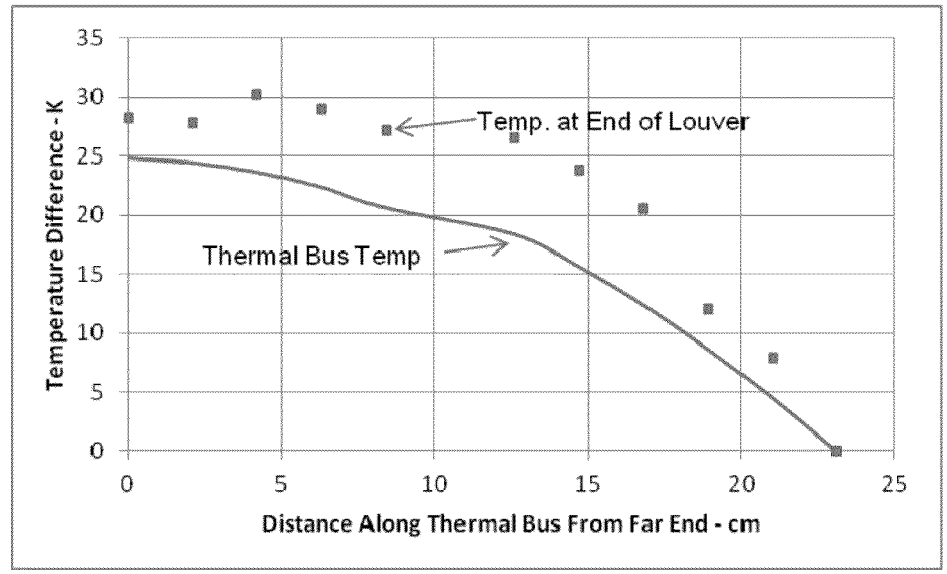
FIG 5b     Straight Thermal Bus

LOW PROFILE CRYOPUMP

BACKGROUND OF THE INVENTION

1. Field of the Invention

The present invention is directed to cryopump used in limited space applications.

2. Discussion of the Related Art

Cryopumps are typically made with the inlet in a plane perpendicular to the axis of the expander cylinder, "in line", or parallel to the axis of the cylinder, "low-profile". Low profile cryopumps are preferred over in line cryopumps in applications where space is limited and are usually mounted under or on the side of the vacuum chamber.

Two stage G-M ("Gifford-Mchon") refrigerators are used to cool cryopumps. These cool a first stage cryopanel at 50 to 100 K and a second stage cryopanel at about 15 K. The expander is usually configured as a stepped cylinder with a valve assembly at the warm end of the first stage, a first stage cold station (at 50 to 100 K) at the transition from the larger diameter first stage to the smaller diameter second stage, and a second stage cold station (at about 15 K) at the far end. An example of an expander that is used in cryopumps as described in this application is found in U.S. Pat. No. 6,256,997.

U.S. Pat. No. 4,150,549 describes a typical in line cryopump that uses a two stage G-M refrigerator to cool two axi-symetric cryopanels. The first stage cools an inlet (warm) panel that pumps Group I gases, e.g. $H_2O$ and $CO_2$, and blocks a significant amount of radiation from reaching the second stage (cold) panel but allows Group II gases, e.g. Ar and $N_2$, and Group III gases, e.g. $H_2$ and He, to pass through it. The Group II gases freeze on the front side of a cup shaped cold panel and Group III gases are adsorbed in an adsorbent on the backside of the cold panel. U.S. Pat. No. 4,530,213 describes a cold panel design that consists of a series of concentric rings of increasing diameter from the inlet region to the back of the housing. This design has more room for large amounts of Ar to collect than the cup design, as is the case with sputtering, and there is more surface area on which the Ar is distributed.

U.S. Pat. No. 4,530,213 shows an arrangement that is typical for in line cryopumps of having heat from the inlet louver, typically consisting of segments of circular cones, transported radially to the inlet end of the warm panel then conducted to the first stage heat station through the warm panel. A similar arrangement is shown for a low profile cryopump in U.S. Pat. No. 5,974,809. U.S. Pat. No. 6,155,059 shows an in line cryopump with straight inlet louvers and two straight bars, thermal busses, that carry heat to opposite sides of the inlet end of the warm panel.

U.S. Pat. No. 4,691,534 describes straight louvers that are individually attached to the warm panel at the inlet end. U.S. Pat. No. 5,542,257 shows in FIGS. 1 and 2 a low profile cryopump that has straight inlet louvers and a single cross bar that transfers heat radially to opposite sides of the warm panel inlet.

U.S. Pat. No. 5,056,319 describes a low profile cryopump with a vibration isolation mechanism. The drawings show straight inlet louvers with a cross rod taking heat to the warm panel but the physical description is lacking.

U.S. Pat. No. 4,356,701 describes an in line cryopump that has conventional conical inlet louvers with radial bars to conduct heat but these bars are not connected to the inlet end of the warm panel, rather they are connected to rods that conduct heat through the second stage cryopanels to the bottom of the warm panel.

U.S. Pat. No. 5,156,007 and U.S. Pat. No. 5,974,809 show a shield that has to be added over the second stage cylinder to avoid having Ar or $N_2$ freeze at some temperature above the cryopanel temperature. The phenomena of "Ar hang up" that results from Ar freezing on the second stage cylinder is described in U.S. Pat. No. 5,156,007.

The cryopanels for in line cryopumps are typically axi-symetric around the expander cylinder. This panel design is frequently adapted to low profile cryopumps by having cut-outs in the cold panel for the expander cylinder, e.g. U.S. Pat. No. 5,156,007. This invention improves upon previous designs by having second stage cryopanels that are comprised of flat surfaces that form a nested tent like structure that is attached to the second stage heat station and extends over the second stage cylinder, between the cylinder and inlet, to shield the cylinder from having Group II gases freeze on it. The second stage heat station does not have to be in the middle of the housing because the second stage cryopanels, which consist of folded flat sheets of copper, can be attached any place along their length.

SUMMARY OF THE INVENTION

The present invention applies to low profile cryopumps having two-stage G-M type refrigerators in which the inlet port to the vacuum chamber is in a plane that is parallel to the axis of the expander cylinder. It generally applies to cryopumps having inlet ports in the size range from 150 mm to 600 mm. The invention has two essential features. First, the inlet louver has straight strips that are oriented transverse to the axis of the expander cylinder and are attached to one or more thermal busses that are attached directly to the first stage heat station. The thermal busses are tapered so the temperature gradient is fairly uniform. Second, the cold (second stage) cryopanel(s) are in planes that are pitched parallel to the axis of the expander cylinder, (a line can be drawn on a cryopanel surface that is parallel to the axis of the expander cylinder) and extend as a shield over most of the second stage expander cylinder. These features reduce the weight of the material to be cooled, resulting in faster cool down times, and simplify the construction.

BRIEF DESCRIPTION OF THE DRAWINGS

FIG. 5 has plots of the temperature pattern in a straight thermal bus and a tapered thermal bus for the cryopump shown in FIGS. 1-4.

DETAILED DESCRIPTION OF THE INVENTION

Figure 1:
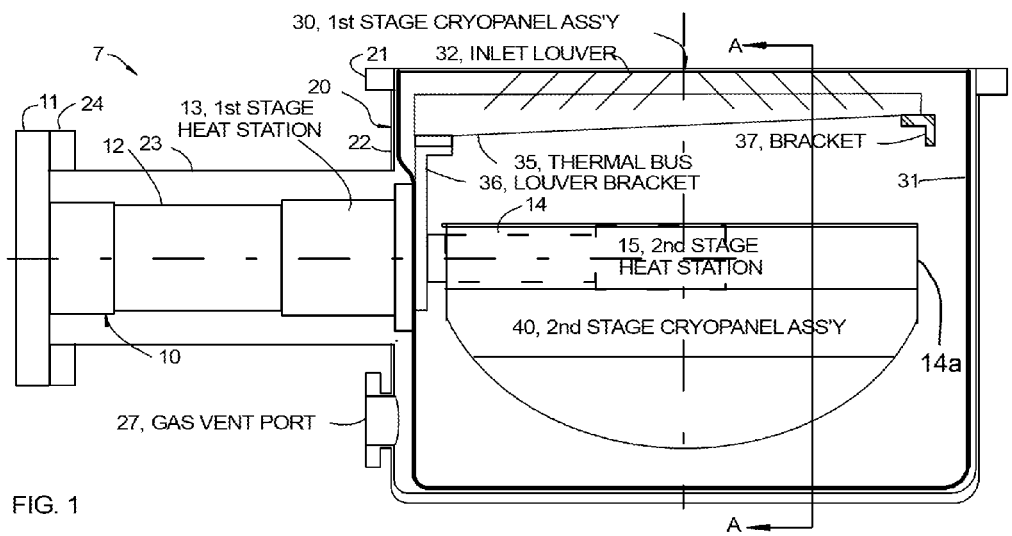
FIG. 1 is a cross section of a side view of a cryopump showing the main features of the present invention for an inlet diameter of 300 mm. The expander drive mechanism is not shown in FIG. 1 but can be seen in U.S. Pat. No. 6,256,997.
Figure 3:
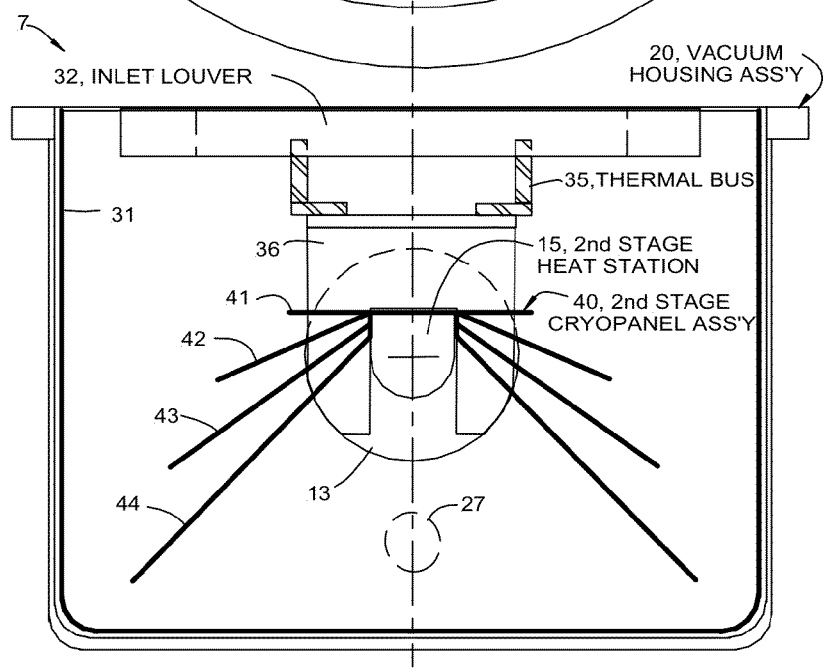
FIG. 3 is a cross sectional view along plane A-A of FIG. 1.

The side view cross section of cryopump assembly 7 shown in FIG. 1 shows the main components including expander cylinder assembly 10, vacuum housing assembly 20, first stage cryopanel assembly 30, and second stage cryopanel assembly 40. Expander cylinder assembly 10 consists of warm flange 11, first stage cylinder 12, first stage heat station 13, second stage cylinder 14 having a cold end 14a, and second stage heat station 15. Vacuum housing assembly 20 consists of inlet mounting flange 21, cryopanel housing 22, expander cylinder housing 23, expander mounting flange 24, and vent/port 27. Not shown are mounting ports on cylinder housing 23 that are generally standard for cryopumps to mount a pressure gauge, temperature sensors, purge gas input, and possibly heaters. The first stage cryopanel assembly 30 consists of radiation shield 31 (frequently referred to as the warm panel), inlet louver 32, thermal bus 35, louver bracket 36, and bracket 37. The second stage cryopanel assembly 40 (cold panel) consists of cryopanels 41, 42, 43, etc. which are shown in FIG. 3. All of the materials used in the construction of first stage cryopanel assembly 30 and second stage cryopanel assembly 40 have a high thermal conductivity, typically ETP or OFHC copper.

Figure 2:
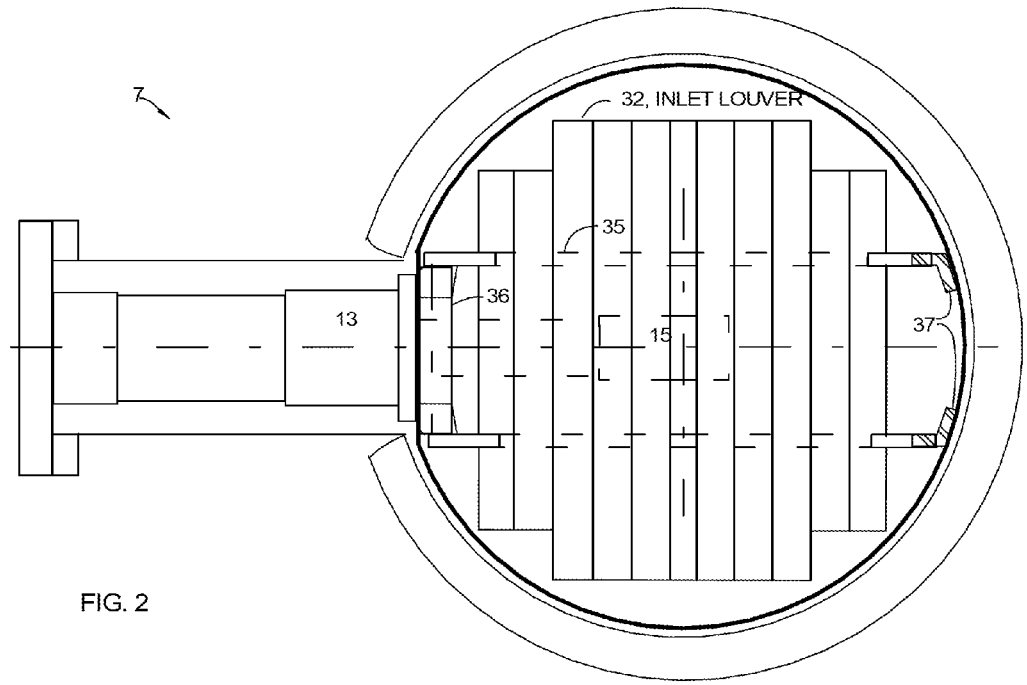
FIG. 2 is a top view of FIG. 1 showing the inlet louver of the cryopump but not the cold panel assembly.

FIG. 2 is a top view showing inlet louver 32 which consists of a series of essentially flat strips that are attached to thermal buses 35. Two busses are a preferred embodiment but one bus may suffice for a 150 mm cryopump. The near end of the thermal busses attached to louver bracket 36 which in turn is attached to first stage heat station 13. The far ends of thermal busses 35 may be attached to brackets 37 which in turn are attached to warm panel 31. These provide structural support and do not transfer a significant amount of heat.

FIG. 3 shows the flat and folded nature of second stage cryopanels 41, 42, 43, etc. Second stage heat station 15 has a flat on one side to provide a large surface for attaching second stage cryopanel assembly 40. Inlet louver 32 runs straight across the pump inlet port in line with second stage cryopanel assembly 40. It generally shields the central part of assembly 40 from radiation. The design helps to distribute the Ar so it freezes uniformly on the surfaces of the second stage cryopanels. A lot of space is available for solid Ar to accumulate. The backsides of the second stage cryopanels are coated with charcoal to adsorb $H_2$.

Figure 4:
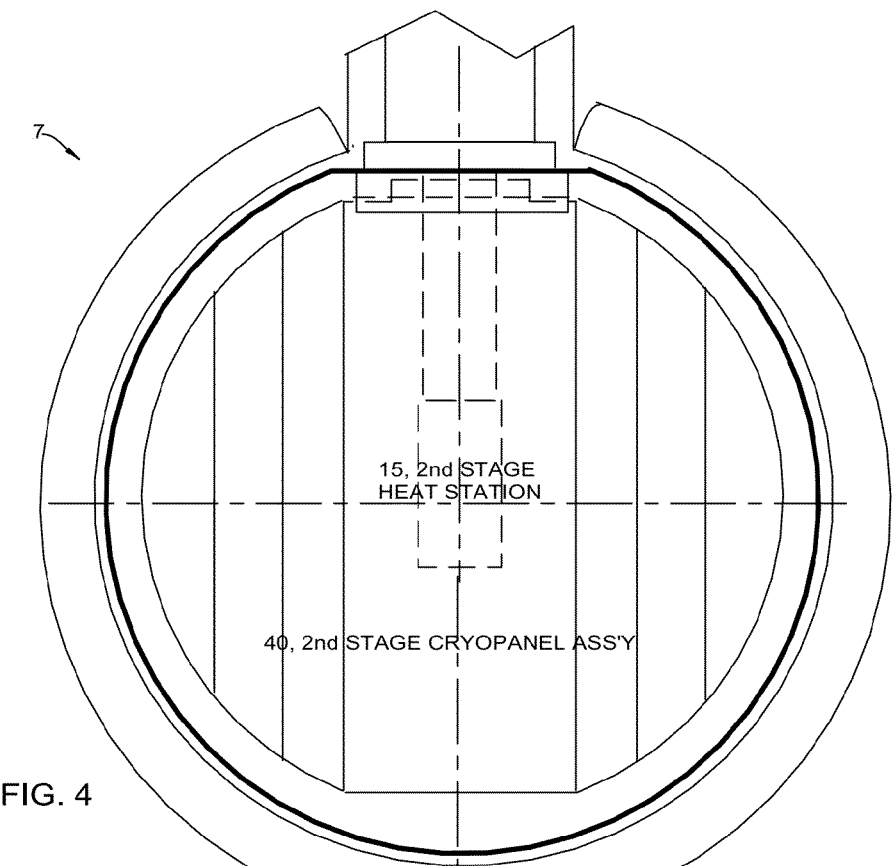
FIG. 4 is a top view of FIG. 1 showing the second stage cryopanels but not the inlet louver and thermal bus.

FIG. 4 shows second stage cryopanel assembly 40 looking into the inlet of the cryopump with the first stage louver 32 removed. Clearance is left between radiation shield 31 and cryopanels 41, 42, 43, etc. so that $H_2$ can flow around the panels to get to the charcoal. This view also shows liquid dam 33 that prevents liquid from flowing out of the inlet when the pump is mounted vertically. First stage heat station 13 is curved so that liquid can flow around second stage cylinder 14 when the pump is oriented vertically. Radiation shield 31 is also mounted to heat station 13 so that liquid cannot flow through openings into the region between first stage cylinder 12 and cylinder housing 23 when the pump is mounted vertically.

FIG. 5 illustrates the difference in the temperature pattern of a tapered thermal bus, FIG. 5a, and a straight thermal bus, FIG. 5b. The comparison is made assuming the same maximum temperature difference between the warmest point on the louver and end of the thermal bus at the near end of the louver. The design is shown in FIGS. 1 and 2 and is based on a heat load of 50 W on the louvers. The five louvers attached at the far end of the thermal bus are assumed to be thicker than the ones at the near end because a greater temperature rise from the thermal bus to the end of the louver is allowable at the colder end of the thermal bus. The copper in the louvers and the thermal bus behind the louvers are calculated to weigh 1,340 g for the tapered thermal bus and 1,710 g for the straight thermal bus, a difference of 370 g or a reduction in weight of more than 20%.

While the low-profile cryopump described in this invention is focused on a 300 mm ID size, the basic concepts of flat panels folded over the second stage cylinder of a low profile cryopump which also shield the cylinder, having the first stage heat station end at the cryopanel vacuum housing, and having heat from a louver conducted directly to the first stage heat station through a thermal bus, can be applied to other size housings but generally in the size range from 150 mm to 600 mm.

What is claimed is:

1. A cryopump cooled by a GM type refrigerator, the cryopump comprising: a two-stage expander cylinder having a longitudinal cylinder axis laying in a first plane; an inlet for admitting cryogens, the inlet having a second plane parallel to the first plane; a first-stage cryopanel assembly attached to a first-stage heat station of the expander cylinder, the first-stage cryopanel assembly comprising: an inlet louver panel having a longitudinal panel axis laying in the second plane, the longitudinal panel axis being transverse to the longitudinal cylinder axis; and a second-stage cryopanel assembly attached to a second-stage heat station of the expander cylinder, the second-stage cryopanel assembly enclosed by the first-stage cryopanel assembly, the second-stage cryopanel assembly comprising a plurality of cryopanels, each cryopanel comprising a flat surface, at least one of the cryopanels being folded and extending over at least 90% of the second-stage cylinder of the expander cylinder; wherein heat is conducted from the inlet louver to the first-stage heat station through a thermal bus, the thermal bus being tapered over a length where the thermal bus is attached to the louver; and wherein a temperature gradient in a tapered section of the thermal bus is nearly constant.

2. The cryopump in accordance with claim 1, wherein the first-stage heat station is proximate to a junction in a vacuum housing assembly between a cryopanel housing and a cylinder housing.

3. A cryopump cooled by a GM type refrigerator, the cryopump comprising: a two-stage expander cylinder having a longitudinal cylinder axis laying in a first plane; an inlet for admitting cryogens, the inlet having a second plane parallel to the first plane; a first-stage cryopanel assembly attached to a first-stage heat station of the two-stage expander; a second-stage cryopanel assembly attached to the second-stage of the two-stage expander, the second-stage cryopanel assembly being enclose by the first-stage cryopanel assembly, wherein the second-stage cryopanel assembly comprising a plurality of cryopanels, each cryopanel comprising a flat surface, at least one of the cryopanels being folded and extending over at least 90% of the second-stage cylinder of the expander cylinder; and an inlet louver panel having a longitudinal panel axis laying in the second plane, the second axis being transverse to the longitudinal expander axis, the inlet louver panel comprising a flat plate, the flat plate conducting heat to the first-stage heat station through a thermal bus, the thermal bus being tapered over a length where the thermal bus is attached to the inlet louver panel, wherein a temperature gradient in a tapered section of the thermal bus is nearly constant.

4. The cryopump in accordance with claim 3, wherein the first-stage heat station is proximate to a junction in a vacuum housing assembly between a cryopanel housing and a cylinder housing.

5. A cryopump cooled by a GM type refrigerator, the cryopump comprising:
a concentric two-stage expander having a warm end, a first stage heat station attached to the cold end of a first stage cylinder which is intermediate a warm end and a second stage heat station attached to a cold end of a second stage cylinder; an expander housing that is attached to a side of a cryopump housing; an inlet to said cryopump housing that is in a plane parallel to an axis of the expander; a first stage cryopanel assembly within said cryopump housing attached to a first stage heat station of said expander cylinder, that encloses a second stage cryopanel assembly attached to a second stage heat station, said second stage cryopanel assembly comprises plates with flat surfaces one or more of which are folded and extend over at least 90% of the side of said second stage cylinder that faces said inlet; an inlet louver at the inlet of said first stage cryopanel assembly consisting of flat plates oriented transverse to said expander cylinder in which heat is conducted from said louvers to said first stage heat station through one or more thermal busses that are tapered over the length where the thermal busses are attached to the inlet louver, heat not flowing from said thermal busses through said first stage cryopanel; and wherein a temperature gradient in a tapered section of said thermal busses is nearly constant.

6. The cryopump in accordance with claim 3, wherein said first stage heat station is proximate the junction of a cryopump housing and an expander housing.

7. A cryopump cooled by a GM type refrigerator, the cryopump comprising:
a concentric two-stage expander having a warm end, a first stage heat station attached to the cold end of a first stage cylinder which is intermediate a warm end and a second stage heat station attached to a cold end of a second stage cylinder; an expander housing that is attached to a side of a cryopump housing; an inlet to said cryopump housing that is in a plane parallel to an axis of the expander; a first stage cryopanel assembly within said cryopump housing attached to a first stage heat station of said expander that encloses a second stage cryopanel assembly attached to a second stage heat station of said expander, and an inlet louver at the inlet of said first stage cryopanel assembly consisting of flat plates oriented transverse to the axis of said expander in which heat is conducted from said louvers to said first stage heat station through one or more thermal busses that are tapered over the length where the thermal busses are attached to the inlet louver, heat not flowing from said thermal busses through said first stage cryopanel; wherein the temperature gradient in the tapered section of said thermal busses is nearly constant and wherein said second stage cryopanel assembly comprises plates with flat surfaces one or more of which are folded and extend over at least 90% of the side of said second stage cylinder that faces said inlet.

8. The cryopump in accordance with claim 7, wherein said first stage heat station is proximate the junction of a cryopump housing and an expander housing.

* * * * *